United States Patent Office 3,540,897
Patented Nov. 17, 1970

3,540,897
GUNNABLE REFRACTORY
Jacques R. Martinet, San Jose, Calif., assignor to Kaiser Aluminum & Chemical Corporation, Oakland, Calif., a corporation of Delaware
No Drawing. Continuation-in-part of application Ser. No. 565,690, July 18, 1966. This application June 3, 1968, Ser. No. 733,785
Int. Cl. C04b 35/04, 35/42, 35/59
U.S. Cl. 106—56    13 Claims

ABSTRACT OF THE DISCLOSURE

A refractory gunning composition comprising refractory grain and a phosphate or borate bond shows vastly improved adherence when gunned, particularly when gunned onto a hot surface, when there is included in the composition hydrated lime. The addition of graphite or other form of carbon to the lime-containing compositions also results in less rebound.

CROSS REFERENCES TO OTHER APPLICATIONS

This application is a continuation-in-part of my copending application Ser. No. 565,690, filed July 18, 1966, now abandoned.

BACKGROUND OF THE INVENTION

This application concerns refractories and particularly refractories adapted for application by the gunning technique.

In recent years it has become quite common to construct, and particularly to repair or patch, high temperature structures such as furnaces by gunning onto their surfaces granular refractories which have been mixed with a tempering amount of water. Of first consideration in evaluating the performance of a refractory gunning composition is the requirement that it must adhere or stick to the furnace wall without excessive rebound at the time of gunning, without subsequent falling away of the emplaced refractory due to lack of adherence and without popping or spalling due to vaporization of water in the composition. In addition, a gunnable refractory composition must also display the usual high temperature properties, for example strength, expected of materials of construction used in high temperature furnaces.

For reasons of economy, in repairing or patching furnaces by the gunning technique it is desirable to minimize the "down" time involved and therefore it is common practice to apply gunned refractory to hot furnace surfaces. It has been found that the problems of adherence and popping are particularly severe in gunning refractories onto hot walls, particularly hot walls made of refractories with smooth, non-porous surfaces. Such smooth, non-porous refractories are, for example, those of high MgO content (i.e., 90% or more MgO), direct-bonded (high-fired) refractories, and fusion cast refractories.

SUMMARY OF THE INVENTION

It has now been found, according to this invention, that the adherence, particularly to a hot wall with a smooth, non-porous surface, of a refractory composition consisting essentially of refractory grain and from 1% to 5% of a bonding agent chosen from the group consisting of phosphates and borates, is vastly improved by incorporating in the refractory composition lime, for example from 2% to 9% hydrated lime. It will be understood that the bonding agent must be soluble in a tempering liquid, for example water, for the composition.

DETAILED DESCRIPTION

While the refractory material used in the practice of this invention can be any such material, the invention has been found to be particularly useful with basic or non-acid refractory materials such as magnesite, periclase, chromite, dolomite, artificial spinel grains, and admixtures of these with each other. The term "periclase" includes grains with 70% or more by weight MgO, the principal impurities being lime (CaO) and silica ($SiO_2$). The composition and sizing of the grain used will be in accordance with good refractory practice, as will be understood by those skilled in the art.

The bond used in the practice of this invention should be either a borate, preferably a water soluble alkali metal borate, for example a sodium borate such as borax (sodium tetraborate decahydrate, $Na_2B_4O_7 \cdot 10H_2O$) or a phosphate such as a soluble alkali metal tripolyphosphate, for example sodium tripolyphosphate. When other bonding materials are used, for example magnesium sulfate, it is found that only half as much of the material adheres to the wall and, in the material that does adhere, there is subsequent popping and spalling.

The hydrated lime, $Ca(OH)_2$, can be any such material but preferably is of a purity so that it contains at least 90% hydrated lime and is of a particle size such that substantially all passes a 100 mesh screen. The lime can be added together with other materials, for example as hydrated calcined dolomite, which is a mixture of $Ca(OH)_2$ and $Mg(OH)_2$.

In using refractory compositions according to this invention, they are mixed with sufficient water or other tempering liquid to form a slurry and the slurry gunned onto the wall to be patched or repaired, using equipment conventional in the industry. Alternatively, the compositions can be mixed with tempering liquid at the nozzle of the gun, again using equipment common in the industry.

When a phosphate bond is used and the composition is to be gunned in slurry form, it is preferred to use an alkaline phosphate, that is to say one with a pH greater than about 7. Sodium tripolyphosphate is an example of such an alkaline phosphate, although various other polyphosphates are also alkaline. The reason for this preference is that the acid phosphates tend to set too rapidly when admixed with water.

It is an advantage of this invention that by it there can be formed refractory compositions which adhere well to furnace walls, particularly hot furnace walls, and which exhibit good strength, particularly at high temperatures.

A further advantage of compositions according to this invention is that, when mixed with sufficient water or other tempering liquid to form a slurry and gunned in that condition, they can be built up to thicknesses as great as two inches without slumping, whereas prior art slurry compositions had to be applied in relatively thin (e.g., 1/8″) layers, with time for setting allowed between the application of successive layers.

Compositions according to this invention are useful in any type of high temperature structure, e.g., a metallurgical furnace, but are particularly useful in steel making furnaces, for example electric arc furnaces, open hearth furnaces, LD vessels, and the like.

EXAMPLE I

As an example of the practice of this invention a refractory composition comprising 47.2 parts of Masinloc chrome ore, 44 parts of a synthetic periclase made from sea water and containing about 95.8% MgO (the remainder being normal impurities, including 1.1% CaO and 2.1% $SiO_2$, except for the addition of about 0.3% $Cr_2O_3$), 1.3 parts bentonite, 3.2 parts sodium tetraborate decahydrate ($Na_2B_4O_7 \cdot 10H_2O$), and 4 parts hydrated lime (all parts being by weight), was admixed with about 37 parts water and the resulting slurry projected onto the slag covered wall of an electric furnace. The wall was made of periclase refractories containing 98% MgO and at the time of the gunning its temperature was about 2900° F. About 95% of the gunned material adhered to the wall and essentially none peeled off subsequently.

By way of comparison, an identical composition but with the hydrated lime omitted, when gunned onto the same hot furnace wall, showed a rebound of 95%. In other words, it essentially did not stick at all.

EXAMPLE II

A refractory composition consisting of 91 parts of the periclase used in Example I, 2.5 parts borax, 1.5 parts bentonite, and 5 parts hydrated lime was mixed with about 36 parts water and the resulting slurry gunned into the badly cut slag line of an electric furnace, where it adhered well.

There can also be incorporated in the refractory compositions of this invention other additives, for example carbonaceous material such as graphite, tar, pitch, coal, coke, and the like. Because it has less tendency to form smoke when gunned onto a hot furnace wall, graphite is preferred. As an example of such a variation, 88.5 parts of the periclase used in the preceding examples, 6.5 parts hydrated lime, 2.5 parts borax, 1.5 parts bentonite, and 2 parts graphite were mixed with 36 parts water and gunned onto a hot electric arc furnace wall. The material stuck well and was still present after 3 heats.

It has been found that the use of refractory compositions containing lime according to this invention enables the use of graphite or other carbonaceous material under circumstances such that, if there were no lime present, the carbon would rapidly burn out of the refractory. The reason for this is not known with certainty, but it is believed that the added lime reacts with MgO present in the refractory composition to form relatively low melting eutectic slags which coat the graphite or other carbonaceous material and prevent its oxidation.

It has also been found, and again the reason for this fact is not clear, that the inclusion of graphite in lime-containing compositions according to this invention results in less rebound when the compositions are gunned onto a hot furnace wall, compared to the same compositions containing no graphite. From 1% to 10% graphite or other carbonaceous material can be incorporated in the compositions.

In the specification and claims, percentages and parts are by weight unless otherwise indicated. Mesh sizes referred to herein are Tyler standard screen sizes which are defined in Chemical Engineers' Handbook, John H. Perry, editor-in-chief, third edition, 1950, published by McGraw-Hill Book Company, at page 963. For example, a size passing a 100 mesh screen corresponds to 147 microns. Analyses of mineral components are reported in the usual manner, expressed as simple oxides, e.g., MgO, $SiO_2$, although the components may actually be present in various combinations, e.g., as a magnesium silicate.

What is claimed is:
1. A refractory composition adapted to be gunned in slurry form consisting essentially of refractory grain, from 1% to 5% by weight of the total composition of a bonding agent chosen from the group consisting of sodium tripolyphosphate [, monosodium dihydrogen orthophosphate,] and borax, and from 2% to 9% by weight of the total composition of hydrated lime.
2. A composition according to claim 1 containing from 2% to 3% of said bonding agent.
3. A composition according to claim 1 including from 1% to 10% by weight of the total composition of carbonaceous material.
4. A composition according to claim 3 wherein said carbonaceous material is graphite.
5. A composition according to claim 1 wherein said refractory grain is non-acid refractory grain.
6. A composition according to claim 5 wherein said bonding agent is sodium tripolyphosphate.
7. A composition according to claim 1 wherein said bonding agent is borax.
8. A refractory composition adapted to be gunned in slurry form consisting essentially of refractory grain chosen from the group consisting of periclase and chrome ore and admixtures thereof, from 1% to 5% of a bonding agent chosen from the group consisting of sodium tripolyphosphate and borax, and from 2% to 9% hydrated lime.
9. A composition according to claim 8 wherein said refractory grain comprises a mixture of approximately equal weight proportions of chrome ore and periclase.
10. A composition according to claim 8 wherein said refractory grain is periclase.
11. A composition according to claim 8 including from 1% to 10% graphite.
12. A composition according to claim 8 wherein said bonding agent is borax.
13. The method of applying a monolithic refractory coating to refractory walls consisting essentially of periclase containing at least 90% MgO, said method comprising (1) admixing refractory grain chosen from the group consisting of periclase and chrome ore and admixtures thereof with from 1% to 5% of a bond chosen from the group consisting of sodium tripolyphosphate and borax and from 2% to 9% hydrated lime; (2) adding water to the admixture to form a slurry; and (3) projecting said slurry onto the furnace wall.

References Cited

UNITED STATES PATENTS

| | | | |
|---|---|---|---|
| 3,232,774 | 2/1966 | Kehl. | |
| 3,236,664 | 2/1966 | Wilson | 106—56 |
| 3,304,187 | 2/1967 | Limes et al. | 106—58 |
| 3,357,842 | 12/1967 | Bowman | 106—58 |
| 3,357,843 | 12/1967 | Bowman | 106—58 |

JAMES E. POER, Primary Examiner

U.S. Cl. X.R.

106—58, 59, 63